(12) United States Patent
Hanagata et al.

(10) Patent No.: US 6,940,666 B2
(45) Date of Patent: Sep. 6, 2005

(54) MAGNETIC TAPE APPARATUS THAT DUPLICATES DATA AND STORES THE DUPLICATED DATA IN PLURAL MAGNETIC TAPE DRIVES

(75) Inventors: Tadashi Hanagata, Tokyo (JP); Yoshiaki Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 203 days.

(21) Appl. No.: 10/374,966

(22) Filed: Feb. 28, 2003

(65) Prior Publication Data

US 2003/0169527 A1 Sep. 11, 2003

(30) Foreign Application Priority Data

Mar. 6, 2002 (JP) ..................................... 2002-060419

(51) Int. Cl.[7] .............................................. G11B 15/12
(52) U.S. Cl. ........................... 360/15; 360/70; 360/72.2
(58) Field of Search .......................... 360/15, 72.2, 61, 360/70, 72.1, 72.3; 711/4, 111, 112, 114

(56) References Cited

U.S. PATENT DOCUMENTS

| | | | | |
|---|---|---|---|---|
| 3,805,284 A | * | 4/1974 | Coon et al. .................... 360/15 |
| 5,566,316 A | * | 10/1996 | Fechner et al. ............. 711/114 |
| 6,076,142 A | * | 6/2000 | Corrington et al. .......... 711/114 |
| 6,138,201 A | * | 10/2000 | Rebalski ......................... 711/4 |
| 2001/0018729 A1 | * | 8/2001 | Johnson ...................... 711/114 |

FOREIGN PATENT DOCUMENTS

| | | |
|---|---|---|
| JP | 3-253933 | 11/1991 |
| JP | 3-259321 | 11/1991 |
| JP | 9-237163 | 9/1997 |

* cited by examiner

Primary Examiner—W. R. Young
Assistant Examiner—Adam R. Giesy
(74) Attorney, Agent, or Firm—Young & Thompson (57) ABSTRACT

There is provided a magnetic tape apparatus which can easily and rapidly restore data and has improved availability. The magnetic tape apparatus includes a plurality of magnetic tape drives, and a control unit for reading and writing information from/in the magnetic tape drives by commands from a host computer. The control unit has a function for storing the same data in the plurality of magnetic tape drives while duplicating the data. The control unit includes a positioning unit for, when the duplicated data is read from one magnetic tape drive to complete the read, performing positioning such that a read position of another magnetic tape drive in which the same data is stored is advanced by a length corresponding to an amount of data read from one magnetic tape drive, and a read continuing unit for continuing read of data from the other magnetic tape drive when data is unsuccessfully read from one magnetic tape drive.

6 Claims, 8 Drawing Sheets

MAGNETIC TAPE APPARATUS THAT DUPLICATES DATA AND STORES THE DUPLICATED DATA IN PLURAL MAGNETIC TAPE DRIVES

BACKGROUND OF THE INVENTION

1. Field of the Invention

The present invention relates to a magnetic tape apparatus and, more particularly to a magnetic tape apparatus having a function which duplicates data, stores the duplicated data, and restores data when the duplicated data is read, a control method for the magnetic tape apparatus, and a magnetic tape apparatus control program.

2. Description of the Related Art

Many conventional sequential access media such as a magnetic tape are used for data storage such as backup of a database. These backup data are very important data which are required to restore data when the data are broken due to a failure of the apparatus, a disaster, or the like. For this reason, in order to avoid a trouble that data cannot be read due to a failure of a medium after the data is written in a magnetic tape, or in order to store data at a remote place in preparation to a disaster, a process of storing the data in a plurality of magnetic tapes to duplicate the data is popularly performed.

However, even though a magnetic tape medium is copied, and even though data is managed by duplication, when data written in the magnetic tape is to be read to restore a database, the restoring process must be temporarily stopped and then restarted by using a copied medium when an error such as a failure of a magnetic tape apparatus or a failure of a magnetic tape medium occurs. This process is complex, and it may be impossible to restore data. For this reason, the process becomes considerably unstable. A case in which a magnetic tape is used will be compared with a case in which a magnetic disk is used.

For example, in a random access device such as a magnetic disk, data is always read by designating the address of an area in which data such as LBA (Logical Block Address) and the length of data to be read. For this reason, when the data is duplicated, even though a failure of the magnetic disk drive or a failure of the medium occurs, the process can be continued by issuing a read command to another magnetic disk which can be normally operated. At the present, the mirroring by magnetic disks is popularly known as RAID (Redundant Arrays of Independent Disks).

In duplication in the above random access device, at any time, the address of a storage area required to access data is designated, so that desired data can be read. For this reason, in addition to an advantage that data is restored when a failure of a disk drive or a failure of a storage medium occurs, the following techniques are disclosed. That is, duplicated disks are alternately accessed to transfer data to a host device at a rate higher than the read rate of the disk (Japanese Unexamined Patent Publication No. 3-253933). Read commands are simultaneously issued to two disks, the data of a disk from which data can be precedently read is transferred to a host device (Japanese Unexamined Patent Publication No. 3-259321), and read commands are simultaneously issued to two disks, data of a disk on which data read is precedently completed is transferred to a host device (Japanese Unexamined Patent Publication No. 9-237163). Therefore, performance is improved.

However, in a sequential access medium such as a magnetic tape, only written data are sequentially read. When the process is interrupted by an error, even if a copy medium is prepared, a restoring process is restarted by using the copy medium, or a repositioning process which performs positioning up to a specific check point and restarts the process from the check point is necessary. Therefore, in case of a failure, even though a magnetic tape medium is duplicated, a complex recovery process is necessary. In such an aspect that a database must be restored due to a failure or a disaster, the complex recovery process delays recovery of the system. As a result, a great loss is caused.

In addition, on the magnetic disk, even though a recording medium is partially defective, data cannot be read in only an area in which the defect exist. In general, when the recording medium is partially defective, another normal recording area is allocated as an alternative area to avoid the drawback, and the other recording area can be accessed without any problem.

However, on the sequential access medium such as a magnetic tape, when a recording area is partially defective, even though the subsequent data are normally written in the medium, these data cannot be reliably accessed. This is because an amount of data such as the number of blocks written in the defective recording area is not known so that the continuity of the data to data which are subsequently written and can be normally read may not be assured. Therefore, even though a recording area is partially defective, of data written in one roll of magnetic tape medium, all data written after a position where a defect exists may be lost. In particular, in order to increase a recording density on a recent magnetic tape, a technique such as data compression or auto-blocking is installed. A partial defective medium makes it further difficult to decide an amount of data, and an amount of data which is lost by the defective medium is large. Therefore, a greater loss is caused in a failure.

SUMMARY OF THE INVENTION

It is an object of the present invention to provide a magnetic tape apparatus which removes an inconvenience held by the prior art, in particular, which can easily and rapidly restore data by using magnetic tape media in which data are written by a duplication magnetic tape apparatus having a mirroring function for posing a plurality of physical drives as one logical drive without performing a complex recovery process by a host device or an operator even though data cannot be normally read by a failure of the physical drive or the magnetic tape medium, which can improve the availability, and which can cause the host device to continue a process without recognizing the occurrence of the failure, a control method therefor, and a magnetic tape apparatus control program.

According to the present invention, there is provided a magnetic tape apparatus including, a plurality of magnetic tape drives and a control unit for reading and writing information from/in the magnetic tape drives by commands from a host computer, wherein the control unit has means for storing the same data in the plurality of magnetic tape drives while duplicating the data. The control unit has a positioning means for, when the reading duplicated data from one magnetic tape drive is completed, performing positioning such that a read position of another magnetic tape drive in which the same data is stored is advanced by a length corresponding to an amount of data read from one magnetic tape drive, and a read continuing function for continuing read of data from the other magnetic tape drive when data is unsuccessfully read from one magnetic tape drive.

At this time, the magnetic tape drives are constituted by two master and slave magnetic tape drives. The control unit includes a positioning means for, when one block of duplicated data is read from the master magnetic tape drive to complete the read, performing positioning such that a read position of the slave magnetic tape drive is advanced by one block, and a read continuing function for continuing read of data from the slave magnetic tape drive when data is unsuccessfully read from the master magnetic tape drive.

With this configuration, when the control unit can normally read data when data is read from the master magnetic tape drive, the control unit advances a read position of the slave magnetic tape drive by one block to set the slave magnetic tape drive in a standby state. In this manner, the read position of the slave magnetic tape drive is always positioned in a block immediately before a read block of the master magnetic tape drive to follow the read position of the master magnetic tape drive. At this time, no data is read from the slave magnetic tape drive, and the slave magnetic tape drive is set in a standby state in case of an emergency. When an error occurs in the read block, e.g., when data cannot be read from the master magnetic tape drive, data is read from a present read position of the slave magnetic tape drive, and the data can be connected to the data which has been read up to now. The read position of the slave magnetic tape drive is positioned in a block immediately before the block in which the error occurs in the master magnetic tape drive, the data can be reliably and rapidly restored. Therefore, the redundancy of the data can be secured without executing a complex process, the process can be suppressed from being interrupted, and the availability of the apparatus can be improved.

In addition to the above configuration, an operation state information storage area of the magnetic tape drives is preferably formed, and the control unit preferably includes an operation state information updating function for, when a process to the magnetic tape drive cannot be executed, storing information representing that the magnetic tape drive is unusable in an operation state information storage area, and means for reducing the magnetic tape drive in which the unusable information is stored to set the magnetic tape drive in a standby state.

In this manner, the control unit can easily recognize a magnetic tape drive to which the process cannot be performed, and the process is continued by the other magnetic tape drive while reserving the use of the magnetic tape drive. For this reason, the process can be suppressed from being interrupted.

The control unit may include an operation state rewriting function which, when the control unit recognizes that a slave magnetic tape drive is in a standby state with reference to operation state information storage area, reads data from the slave magnetic tape drive, which checks whether or not data in a data block read when the data can be read is equal to data in a data block which is being read at the present on the master magnetic tape drive, and which rewrites the operation state information of the slave magnetic tape drive into information representing that the data can be read and written when the data are equal to each other.

In this manner, to the slave magnetic tape drive in the standby state (unreadable or incorporation waiting state), a data block which will be read in a readable state is read. When the data can be read, it is checked whether or not the data read from the slave magnetic tape drive is equal to data in the data block stored in the master magnetic tape drive which is being read at the present. When the data are equal to each other, information representing that the slave magnetic tape drive can be read is stored as the operation state information. Therefore, the magnetic tape drive which is reduced once can be reused, and the redundancy of the data can be secured.

Furthermore, data blocks in the magnetic tape drives have the same block identification information, and the operation state rewriting means held by the control unit is a means which, when a data block of the slave magnetic tape drive in a standby state cannot be read, detects a readable data block subsequent to the data block, and, when a block identification number of the readable data block is larger than a data block identification number of the data block which is being read from the master magnetic tape drive, rewrites the operation state information of the slave magnetic tape drive into information representing an incorporation waiting state. The control unit may not read data from a magnetic tape drive on which the operation state information is the incorporation waiting state.

In this manner, when an unreadable block is skipped on the slave magnetic tape drive in the reduced state, a block from which data can be read can be detected. For this reason, when the read position of the slave side precedes the present read position on the master side, the read position on the slave magnetic tape drive is made standby at the position. Therefore, as the read process advances to the master magnetic tape drive, the read position of the master magnetic tape drive becomes close to the standby position of the slave magnetic tape drive. For this reason, the standby position can be positioned in a block immediately before the read position of the master magnetic tape drive, and, as described above, the slave magnetic tape drive is synchronized with the master magnetic tape drive to make it possible to restore the slave magnetic tape drive from the standby state.

A magnetic tape apparatus includes, a plurality of magnetic tape drives, and a control unit for reading and writing information from/in the magnetic tape drives by commands from a host computer. The control unit includes means for storing the same data in the plurality of magnetic tape drives while duplicating the data and a plurality of data buffers corresponding to the magnetic tape drives in which the duplicated data read from the magnetic tape drives are temporarily stored. The control unit includes a positioning means for, when the reading duplicated data from one magnetic data is completed, moving a read position of another data buffer in which the same data is stored by a length corresponding to an amount of data read from one data buffer to perform positioning, and a read continuing function for continuing read of data from the the other magnetic tape drive when data is unsuccessfully read from one magnetic tape drive.

With this configuration, when the data read from the magnetic tape drives are temporarily stored in the data buffers, respectively, and when read on the master side can be executed in the areas, positioning of a read position on the slave side is executed, and the read position of the master magnetic tape drive is always synchronized with the read position of the slave magnetic tape drive. Therefore, when data in the master buffer cannot be read, by switching an object to be read to the slave buffer, data restoration can be more rapidly executed while securing secure the continuity of the read data because the switching time is only time for switching buffers.

According to the present invention, there is provided a method for controlling an operation of a magnetic tape apparatus to read data duplicated and stored in a plurality of magnetic tape drives. A control unit, when the reading duplicated data from one magnetic tape, drive is completed, performs positioning such that a read position of another magnetic tape drive in which the same data is stored is advanced by a length corresponding to an amount of data read from one magnetic tape drive, and the control unit continues read of data from the other magnetic tape drive when data is unsuccessfully read from one magnetic tape drive.

Furthermore, according to the present invention, there is provided a program for controlling an operation of a magnetic tape apparatus such that data duplicated and stored in a plurality of magnetic tape drives are read from the magnetic tape drives, wherein, when the reading duplicated data from one magnetic tape drive is completed, positioning is performed such that a read position of another magnetic tape drive in which the same data is stored is advanced by a length corresponding to an amount of data read from one magnetic tape drive, and read of data from the other magnetic tape drive is continued when data is unsuccessfully read from one magnetic tape drive, or there is provided a storage medium in which the program is stored. With this configuration, the same effect as described above can be achieved.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying, wherein:

DETAILED DESCRIPTION OF THE PREFERRED EMBODIMENTS

<First Embodiment>

Figure 1:
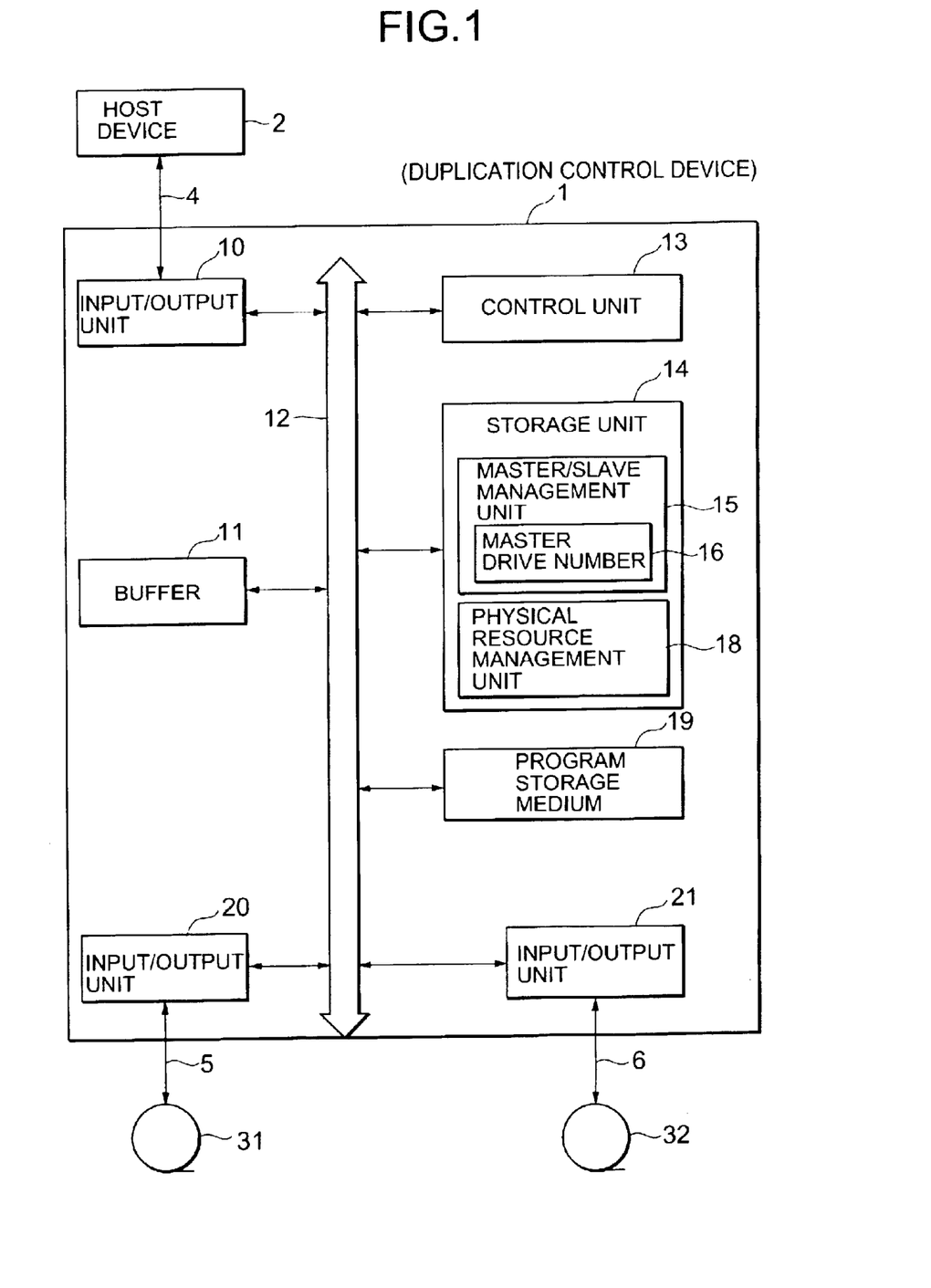
FIG. 1 is a function block diagram showing a configuration according to a first embodiment of the invention.
Figure 2:
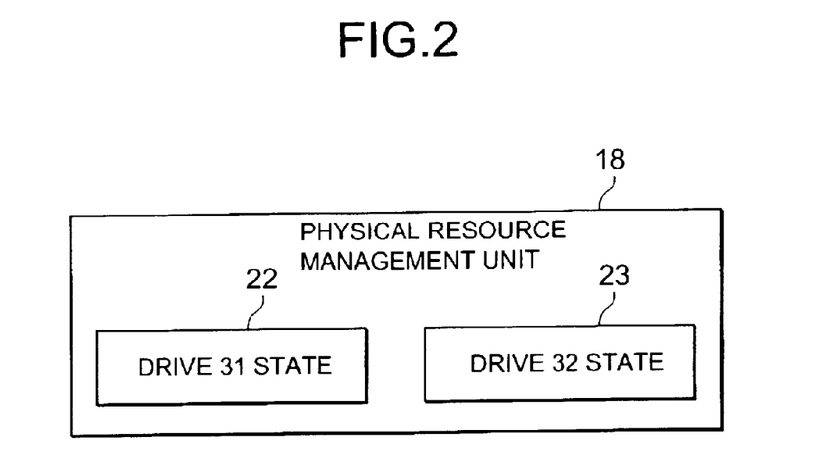
FIG. 2 is a conceptual diagram showing the contents of a physical resource management unit disclosed in FIG. 1.
Figure 3:
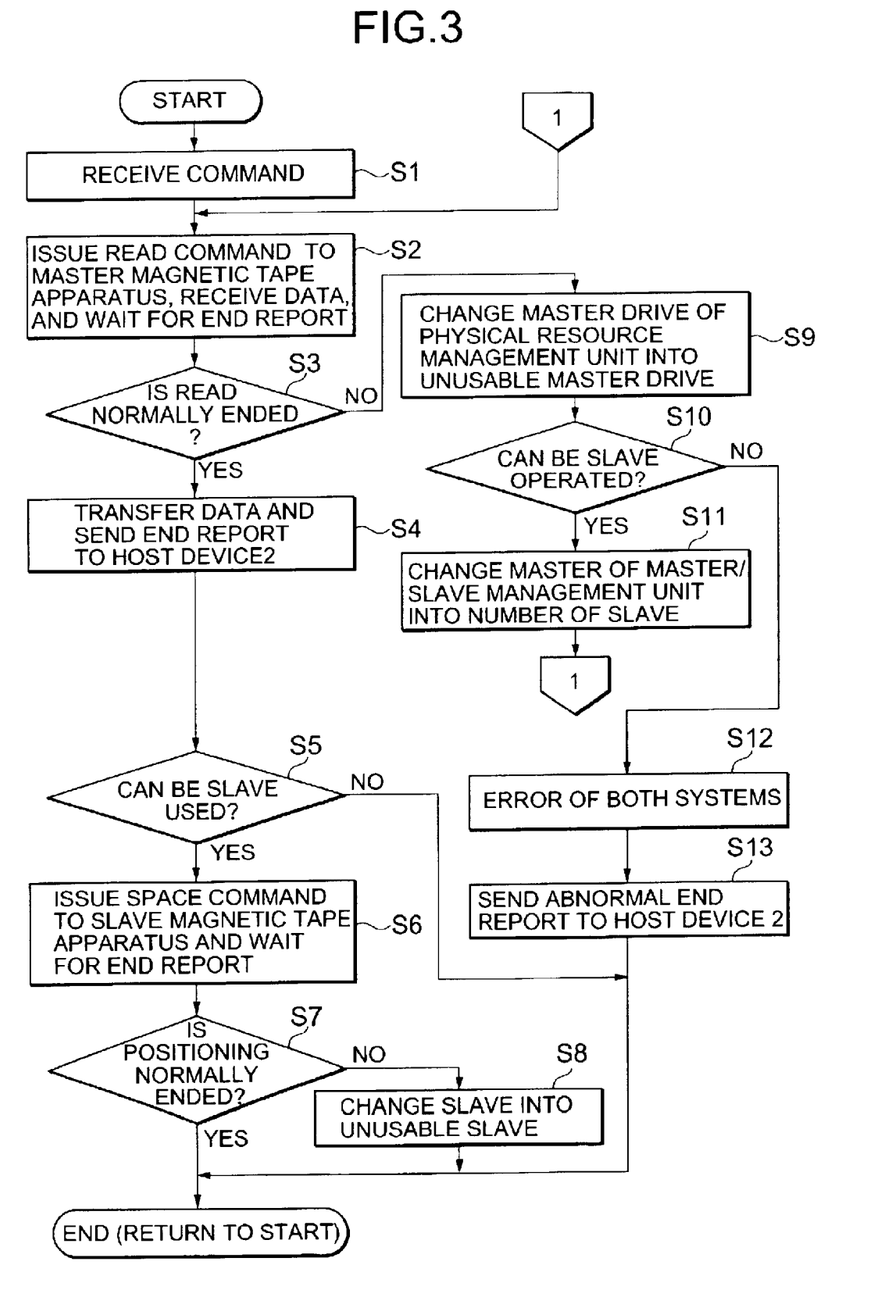
FIG. 3 is a flow chart showing an operation of a magnetic tape apparatus according to the first embodiment.

A first embodiment of the present invention will be described below with reference to FIGS. 1 to 3. FIG. 1 is a function block diagram showing a configuration in the first embodiment. FIG. 2 is a conceptual diagram showing the contents of a physical resource management unit. FIG. 3 is a flow chart showing an operation of the apparatus itself.

(Configuration)

As shown in FIG. 1, a magnetic tape apparatus according to this embodiment is constituted by two magnetic tape drives (31, 32), a duplication control device 1 which poses two magnetic tape drives as one magnetic tape apparatus for a host device 2 such as a host computer for commanding reading or writing data in these magnetic tape drives, a signal line 4 for connecting the host device 2 and the duplication control device 1 to each other, and signal lines 5 and 6 for connecting the magnetic tape drives 31 and 32 to the duplication control device 1.

The duplication control device 1 is constituted by an input/output unit 10 for transmitting/receiving commands or data to/from the host device 2, input/output units 20 and 21 for transmitting/receiving commands or data to/from the magnetic tape drives 31 and 32 on which the magnetic tapes mount, a buffer 11 for temporarily storing data exchanged between the host device 2 and the magnetic tape apparatus, a control unit 13 for causing a microprogram to integrate and control operations of function blocks, a storage unit 14 in which information required for control of the control unit 13 is stored, a program storage medium 19 in which the microprogram operated by the control unit 13 is stored, and an internal bus 12 for connecting these units and the like to each other.

The input/output unit 10 and the signal line 4 correspond to a Fibre Channel protocol controller and Fibre Channel cable, respectively, when the magnetic tape apparatus and the host device 2 are connected to each other with a Fibre Channel. The input/output unit 10 and the signal line 4 correspond to a SCSI controller and a SCSI cable, respectively, when the magnetic tape apparatus and the host device 2 are connected to each other with a SCSI (Small Computer System Interface).

Similarly, when the magnetic tape drives 31 and 32 are connected to each other with a Fibre Channel, the input/output units 20 and 21 and the signal lines 5 and 6 correspond to a Fibre Channel protocol controller and a Fibre Channel cable, respectively. When the magnetic tape drives 31 and 32 are connected to each other by a SCSI, the input/output units 20 and 21 and the signal lines 5 and 6 correspond to a SCSI controller and a SCSI cable, respectively.

The interface of the host device 2 and the input/output unit 10 and the interface between the input/output units 20 and 21 and the magnetic tape drives 31 and 32 on which the magnetic tapes mount on, may be interfaces of the same type or may be interfaces of different types. In addition, although the input/output unit 20 and the input/output unit 21 are independently described, the signal line 6 may be connected to the signal line 5 without using the input/output unit 21, and the input/output unit 20 is shared by the magnetic tape drives 31 and 32 on which the magnetic tapes mount on.

The internal bus 12 is a signal line used when the control unit 13 mounted on the duplication control device 1 communicates with another circuit. In general, as the internal bus 12 is a local bus, a PCI bus for a CPU, or the like.

The control unit 13 is a microprocessor (CPU or MPU) operated by program control to control the input/output unit 10 and the input/output units 20 and 21 according to a program stored in the program storage medium 19. The program may be operated while directly reading the program from the program storage medium 19 through the internal bus 12, or the program may be copied from the program storage medium 19 into the storage unit 14 through the internal bus 12 and operated while reading the program stored in the storage unit 14 through the internal bus 12.

The storage unit 14 stores data for operating the control unit 13. For this reason, it is necessary that read and write operations can be performed to the storage unit 14. In general, as the storage unit 14, a RAM (Random Access memory) is known. The storage unit 14 includes a Master/Slave management unit 15 for managing a specific one of the magnetic tape drives 31 and 32 corresponds to a Master or a Slave, and a physical resource management unit 18 for storing states of the magnetic tape drives 31 and 32. The physical resource management unit 18 includes operation state information storage areas for storing information related to the operation states of the magnetic tape drives 31 and 32.

The program storage medium 19 stores a program for operating the control unit 13. As the program storage medium 19, a read-only medium is preferably cited because it is necessary only that a program can be read by the control unit 13. In general, a nonvolatile memory such as a flash memory or a ROM (READ Only Memory), an FD (Floppy Disk), a CD-ROM, or the like is cited.

A program which is executed by the control unit 13 and stored in the storage unit 14 will be exemplified. The program controls an operation of a magnetic tape apparatus by the following manner. That is, when duplicated data is read from one magnetic tape drive (Master) to complete the read, the program performs positioning such that a read position of another magnetic tape drive (Slave) in which the same data is stored is advanced by a length corresponding to an amount of data read from one magnetic tape drive (Master) (e.g., one block). When data is unsuccessfully read from one magnetic tape drive (Master), or a process of continuing read of data from the read position of the other magnetic tape drive(Slave) is executed.

When the above program is incorporated in the control unit 13, the following means are structured in the control unit 13. More specifically, the means include a positioning means for performing, when duplicated data is read from one magnetic tape drive(Master) to complete the read, positioning such that a read position of another magnetic tape (Slave) in which the same data is stored is advanced by a length corresponding to an amount of data read from one magnetic tape drive, and a read continuing function for continuing read of data from the read position of the other magnetic tape drive when data is unsuccessfully read from one magnetic tape drive.

In the control unit 13, an operation state information updating function for storing, when a process cannot be executed by performing the process to a magnetic tape drive, information representing that the magnetic tape drive is unusable in an operation state information storage area and a reducing function for reducing the magnetic tape drive in which the unusable information is stored to set the magnetic tape drive in a standby state are structured. These functions also operate such that programs for these functions are similarly stored in the program storage medium 19 or the like in advance and read by the control unit 13.
(Operation)

Read of data from the magnetic tape drives 31 and 32 to the host device 2 in this embodiment will be briefly described below. At this time, the magnetic tape apparatus in this embodiment comprises the two magnetic tape drives 31 and 32 serving as storage media. However, the magnetic tape apparatus may comprise three or more magnetic tape drives. More specifically, two or more magnetic tape drives (slaves) for recovery may be arranged. This is also applied to other embodiments.

The magnetic tape drives 31 and 32 serving as storage medium in which the same data are written are loaded. A read command issued from the host device 2 is received and interpreted by the input/output unit 10. The magnetic tape drive 31 of a drive number stored as a Master drive number of the Master/Slave management unit 15 issues a read command to the magnetic tape drive 31 through the input/output unit 20 when the Master drive number 1, and the Master/Slave management unit 15 waits for data and an end report. The read data is sent from the input/output unit 20 and stored in the buffer 11 through the internal bus 12 once.

When read is normally completed, the data stored in the buffer is transferred from the input/output unit 10 to the host device 2 through the internal bus 12 to report the normal end. At the same time, positioning of the magnetic tape drive 32 on the Slave side is performed. More specifically, a read standby position of the magnetic tape drive 32 is advanced. In this state, since the drive number is stored as 1, a positioning command for advancing the read standby position by one block to the magnetic tape drive 32 corresponding to 2 through the input/output unit 21, is issued.

If data is unsuccessfully read from the magnetic tape drive 31, the Slave magnetic tape drive 32 is changed into the Master magnetic tape drive 31, and the read operation is similarly performed. In this manner, the read operations from the two magnetic tapes are performed.

The physical resource management unit 18 manages whether data can be read from the magnetic tape drives 31 and 32. Two pieces of information representing the states of the magnetic tape drives 31 and 32 are stored in the physical resource management unit 18. As these pieces of information, the pieces of information representing the states or the like of the magnetic tape drives 31 and 32 are stored correspondingly to the tape drives, respectively. More specifically, when no tape is loaded, information representing "unusable" is stored in an area for a state 22 of the magnetic tape drive 31 and a state 23 of the magnetic tape drive 32 serving as operation state information storage areas. When tapes are loaded, information representing "usable" is stored in an area for the state 22 of the magnetic tape drive 31 and the state 23 of the magnetic tape drive 32. When an error occurs in read or positioning of the magnetic tape drives 31 and 32 to make it impossible to read from the magnetic tape drives 31 and 32, the information "usable" is changed into the information "unusable".

An operation of the magnetic tape apparatus according to this embodiment will be described in detail with reference to the block diagrams in FIGS. 1 and 2 and the flow chart in FIG. 3. FIG. 2 is a diagram showing the contents of the physical resource management unit 18 in this embodiment.

Media on which the same data are written are loaded on the magnetic tape drives 31 and 32, respectively. A read command issued from the host device 2 is received and interpreted by the input/output unit 10 (step S1). The read command is issued to the magnetic tape drive 31 of a drive number stored as a Master drive number of the Master/Slave management unit 15. When the Master drive number is 1, the read command is issued to the magnetic tape drive 31 through the input/output unit 20. Read data is sent from the input/output unit 20 and stored in the buffer 11 through the internal bus 12 once. The Master/Slave management unit 15 waits for an end report from the magnetic tape drive 31 (step S2).

When the read is normally completed, the data stored in the buffer is transferred from the input/output unit 10 to the host device 2 through the internal bus 12. The normal end is reported to the host device 2 (step S3 and step S4). At the same time, the magnetic tape drive 32 on the Slave side is positioned. When 1 is stored as a drive number, e.g., the Master, which is different from a drive number stored as the Master drive number of the Master/Slave management unit 15, the physical resource management unit 18 checks the state of the Slave for the magnetic tape drive of 2. When 2 is stored in the Master, the physical resource management unit 18 checks the state of the Slave for the magnetic tape drive of 1. When the magnetic tape drive can be operated, a positioning command for advancing a read position is issued. When the drive number to be issued is 2, a positioning command (Space command) for advancing a read position by 1 block is issued to the magnetic tape drive 32 through the input/output unit 21 (step S5 and step S6).

If the Slave drive is in an "unusable" state, the Slave drive is not operated, and waits for reception of the next command (step S5).

When the normal end of positioning is reported by the magnetic tape drive 32, the operation is completed, and the drive waits for reception of the next command (step S7). If an abnormal end such as a data error or a failure of the apparatus is reported by the magnetic tape drive 32, when the Slave drive cannot be operated, the Slave drive is reduced. At this time, the state of the Slave drive of the physical resource management unit 18, in this case, the state of the magnetic tape drive 32 is changed into "unusable" (step S8). The Slave drive waits for reception of the next command.

In the step S3, a case in which read from the Master drive is abnormally ended will be described below. When the read from the Master drive is abnormally ended, the Master drive is reduced. For this reason, the state of the Master drive of the physical resource management unit 18, i.e., the state of the magnetic tape drive 31 is changed into "unusable" (step S9). In order to replace the Master with the Slave, the state of the Slave drive is checked. When 1 is stored as a drive number, e.g., the Master, which is different from a drive number stored as the Master drive number of the Master/Slave management unit 15, the physical resource management unit 18 checks the state of the Slave for the magnetic tape drive of 2. When 2 is stored in the Master, the physical resource management unit 18 checks the state of the Slave for the magnetic tape drive of 1. When the magnetic tape drive can be operated, the Master drive number of the Master/Slave management unit 15 is rewritten by the number of the Slave drive (step S10 and step S11). Returning to step S2, a read command is issued to the magnetic tape drive serving as a new Master drive with which the Slave drive is replaced, and the same process as described above is performed.

When the Slave drive has been "unstable" in step S10, errors occur in both the systems. For this reason, an abnormal end report is sent to the host device 2 (step S12 and step S13).

In this embodiment, for descriptive convenience, the flow in which the magnetic tape drive 32 is positioned after the data read from the magnetic tape drive 31 into the buffer 11 is sent to the host device 2 has been described in FIG. 3. However, the transfer process to the host device 2 and the positioning process of the magnetic tape drive 32 don't have to be sequentially performed. These processes may be simultaneously performed. This configuration can also applied to other embodiment.

In this manner, in the magnetic tape apparatus which can duplicate and store data, error occurrence states and tape positions of two physical magnetic tape drives are managed by using the two magnetic tapes which are subjected to mirroring. In this state, even though data cannot be normally read due to a failure of one physical drive or one magnetic tape medium, a read position of the other magnetic tape medium is positioned in a block immediately in front of the block in which the error occurs. For this reason, data can be read from the magnetic tape medium within a short period of time. In this manner, when data of the other magnetic tape drive is automatically used, even though a complex recovery process is not performed by the host device or an operator, the process can be continued in the reduced state without recognition of the failure by the host device. Therefore, the process in the host device can be prevented from being interrupted, and the availability can be improved.

As described in this embodiment, read commands are not issued to the two magnetic tape derives, and a read command is issued to one magnetic tape drive. When data is successfully read, a positioning command is issued to the Slave drive, so that the band of an internal bus required in a normal operation can be reduced.

<Second Embodiment>

Figure 4:
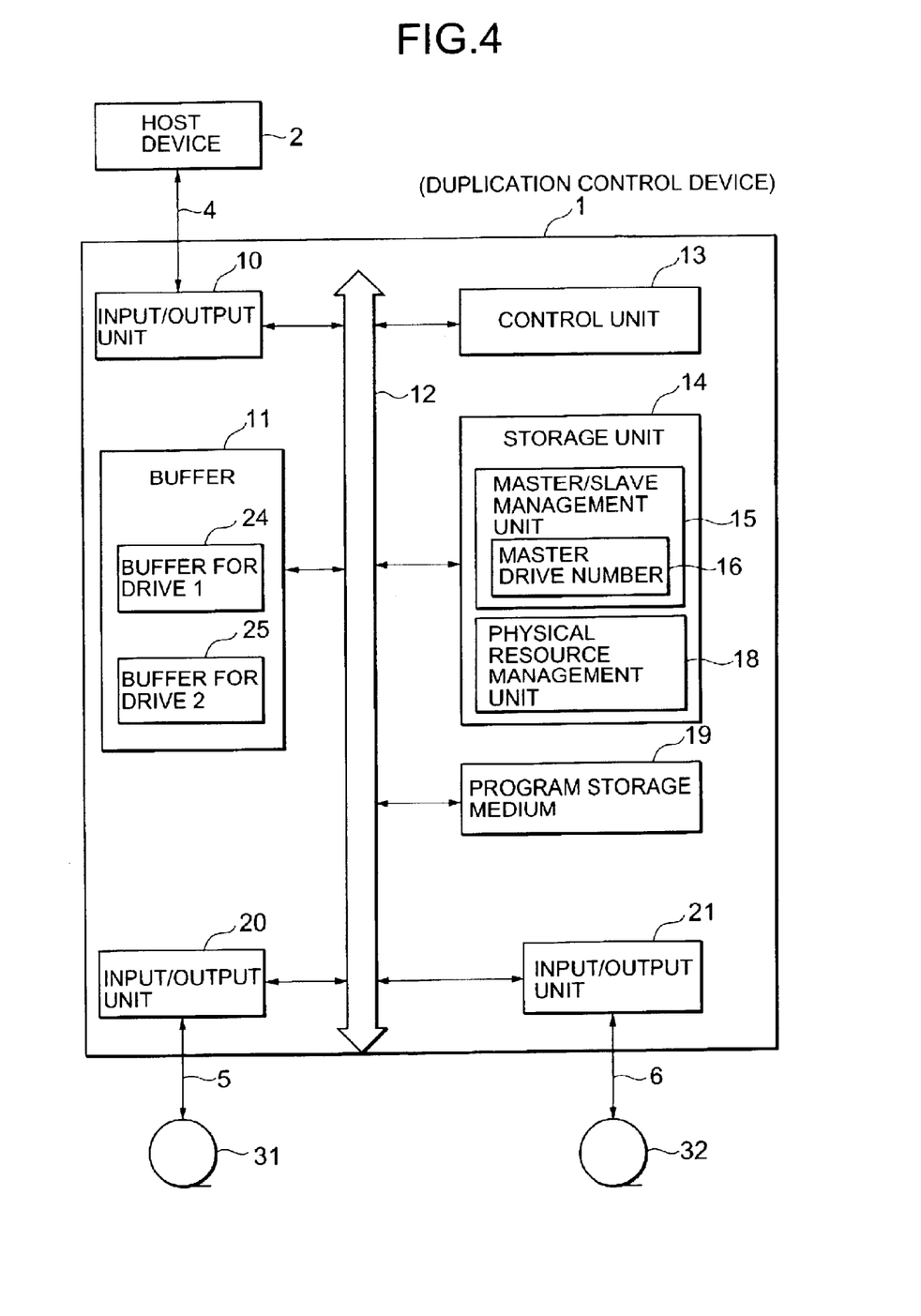
FIG. 4 is a function block diagram showing a configuration according to a second embodiment of the invention.
Figure 5:
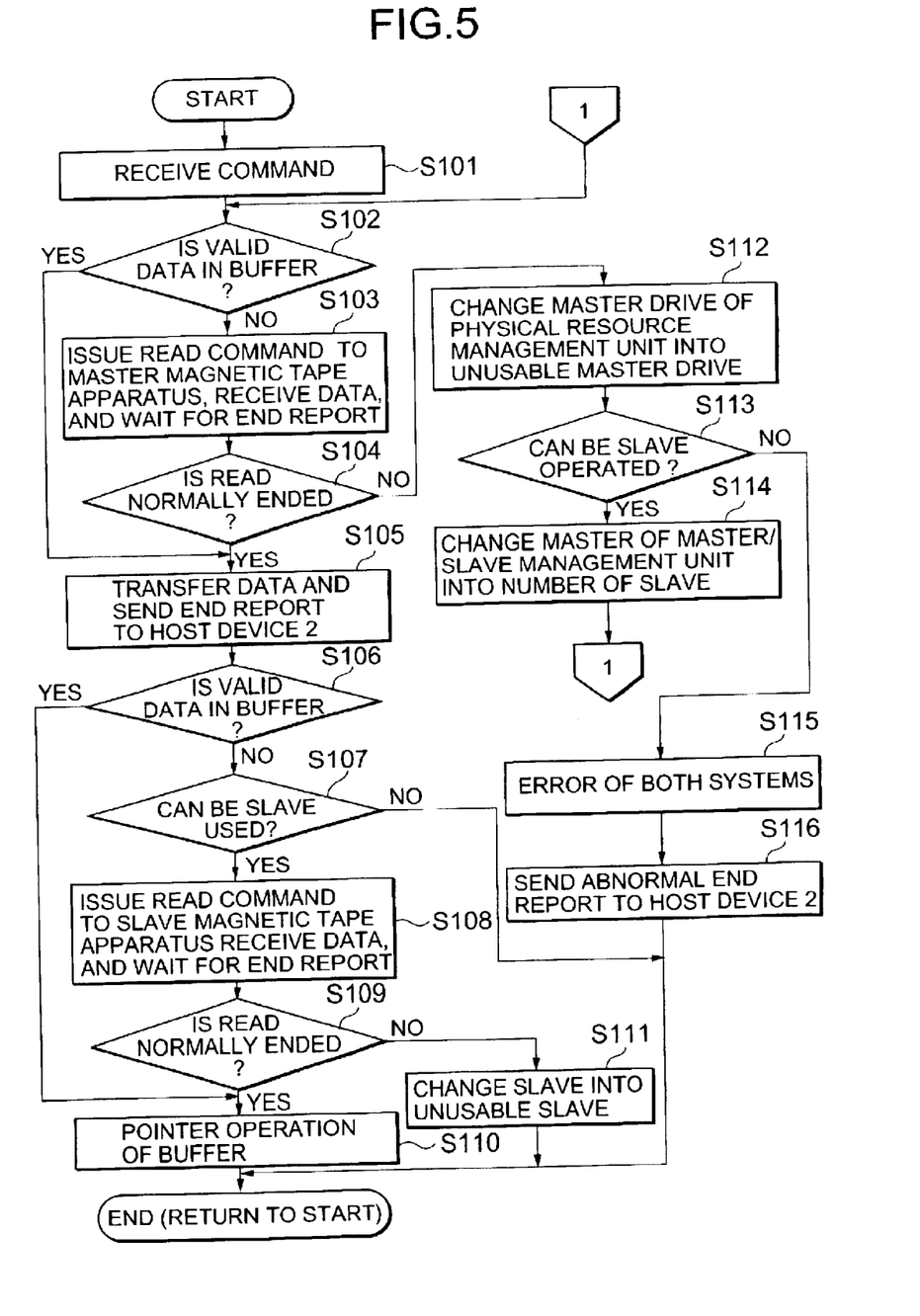
FIG. 5 is a flow chart showing an operation of a magnetic tape apparatus according to the second embodiment.

A second embodiment of the present invention will be described below with reference to FIGS. 4 to 5. FIG. 4 is a function block diagram showing a configuration in the second embodiment. FIG. 5 is a flow chart showing an operation of the apparatus itself. In the first embodiment, the explanation is made in the assumption that a magnetic tape apparatus including magnetic tape media on which one logical block as one physical block. However, in the second embodiment, a configuration using a magnetic tape apparatus including magnetic tape medium which is automatically blocked will be described below.

(Configuration)

The magnetic tape apparatus according to this embodiment has the same configuration as that of the first embodiment. In this embodiment, the magnetic tape apparatus has a buffer 24 for drive 1 for storing data read from the magnetic tape drive 31 serving as drive 1 and a buffer 25 for drive 2 for storing data read from a magnetic tape drive 32 serving as drive 2 are arranged in a buffer 11. More specifically, a plurality of data buffers corresponding to the magnetic tape drives 31 and 32 are arranged to read duplicated data from the magnetic tape drives 31 and 32 to temporarily store the data. Therefore, when three or more magnetic tape drives are arranged, buffers the number of which is equal to the number of magnetic tape drives are arranged.

The control unit 13 has a positioning function for performing, when duplicated data is read from one data buffer (for Master) to complete the read, positioning such that a read position of another data buffer (for Slave) in which the same data is stored is advanced by a length (for example, 1 block) and a read continuing function for continuing read of data from the read position of the other magnetic tape drive (for Slave) when data is unsuccessfully read from one data buffer (for master). Since the other function is the same as that of the first embodiment, a description thereof will be omitted. As in the above description, as the functions, function programs are prepared in the program storage medium 19 in advance, and the function programs are incorporated in the control unit 13 to realize the functions.

(Operation)

An operation of the second embodiment will be described below with reference to the block diagram in FIG. 4 and the flow chart in FIG. 5.

A read command issued from the host device 2 is received and interpreted by the input/output unit 10 (step S101). It is checked whether or not valid data is stored in a data buffer corresponding to a drive number stored as the Master drive number of the Master/Slave management unit 15 (step S102). When the Master drive number is 1, it is checked whether valid data is stored in the buffer 24 for drive 1. If the valid data is stored, the control flow shifts to the process of transferring the data to the host device 2 (step S105). If valid data is not stored in the buffer 24, as in the first embodiment, a read-command is issued to the magnetic tape drive of the Master drive number. When the Master drive number is 1, a read command is issued to the magnetic tape drive 31 through the input/output unit 20 (step S103). The read data is sent from the input/output unit 20 and stored in the buffer 11 through the internal bus 12. The drive waits for a report of the end of process from the magnetic tape drive 31 (step 104).

When the read from the master magnetic tape drive is normally completed, the data stored in the buffer from the input/output unit 10 is transfered to the host device 2 through the internal bus 12 (step S105). The normal end is reported to the host device 2. At the same time, positioning of the magnetic tape drive on the Slave side is performed. It is checked whether valid data is stored in the data buffer of a drive of a drive number different from the drive number stored as the Master drive number of the Master/Slave management unit 15 (step S106). For example, when 1 is stored as the Master drive number, it is checked whether valid data is stored in the buffer 25 for drive 2 of the magnetic tape drive 32 of drive 2 or not. When 2 is stored as the Master drive number, it is checked whether valid data is stored in the buffer 24 for drive 1 of the magnetic tape drive 31 of drive 1 or not. If the valid data is stored, a pointer in the corresponding buffer is updated to complete the positioning (step S110). More specifically, when the data read in the buffers 24 and 25 are constituted in units of, e.g., blocks, a read position of the data buffer on the Slave side is advanced by one block.

When no valid data is stored in the data buffer on the Slave side, data is read from the magnetic tape drive. At this time, the state of the magnetic tape drive is checked by the physical resource management unit 18. When the magnetic tape drive is operable, a read command is issued (step S107 and step S108). For example, when a drive number to be issued is 2, the physical resource management unit 18 issues a read command to the magnetic tape drive 32 through the input/output unit 21, and the drive waits for reception of data.

When the Slave drive is in an "unusable" state, the Slave drive is not operated, the Slave drive waits for reception of the next command (step S107).

In step S108, when data is received from the Slave magnetic tape drive, the data is stored in a part corresponding to the buffer 11, in this case, the buffer 25. When the normal end is reported, the operation is completed. As in the above description, the physical resource management unit 18 performs positioning of the buffer for Slave, and waits for the next command (step S109 and step S110).

If an abnormal end such as a data error or a failure of the apparatus is reported to make it impossible to operate the Slave drive, the Slave drive is reduced. The state of the Slave drive of the physical resource management unit 18, in this case, the state of the magnetic tape drive 32 is changed into an "unusable" state (step S111). The Slave drive waits for reception of the next command.

Since a case in which read of the Master drive in step S104 is abnormally ended is the same as that described in steps S9 to S13 (see FIG. 3) in the first embodiment, a description thereof will be omitted.

In the configuration described above, when no valid data is stored in the buffer when a command from the host device 2 is received, data is read from the magnetic tape drive. However, when valid data in the buffer comes to an end without waiting a command from the host device 2, additional read may be performed. In this manner, because a read command is issued to the magnetic tape drive after the buffer is empty, a period of time for waiting for reception of data can be shortened.

In this manner, in the magnetic tape apparatus which can duplicate and store data according to this embodiment, even in a configuration using a medium which is automatically blocked, data in the respective magnetic tape media are read out to the buffer 11 at once, and the data are positioned in the buffer. In this case, when the data cannot be normally read due to a failure of one physical drive or a magnetic tape medium, by using data read from another magnetic tape medium, without performing a complex recovery process by the host device or an operator, the process can be continued in a reduced state without recognition of occurrence of the failure by the host device. For this reason, the process in the host device can be prevented from being interrupted, and the availability can be improved.

At this time, an amount of data is read out to the buffer 11 at once. For this reason, when data cannot be normally read out due to a failure of one physical drive or a magnetic tape medium, the other physical drive has read the corresponding block and stored the block in the buffer 11 in many cases. Therefore, waiting time for the switching operation can be shortened, and recovery read can be rapidly performed.

<Third Embodiment>

Figure 6:
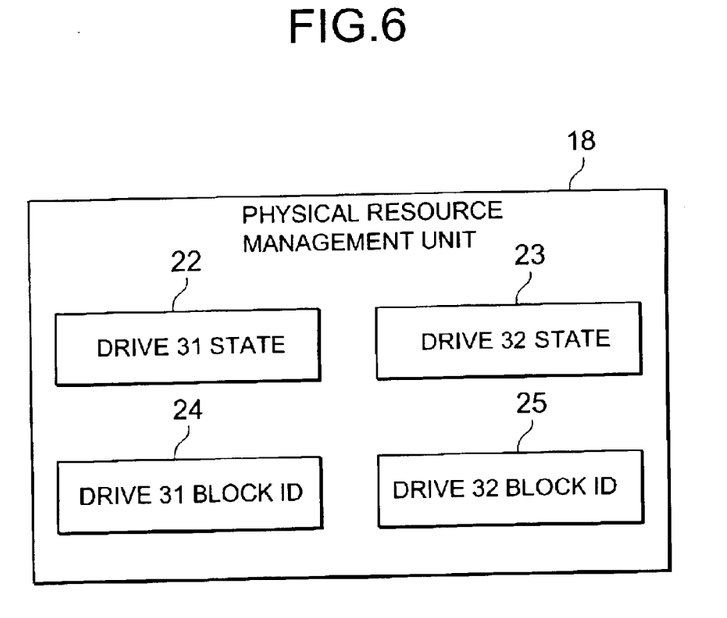
FIG. 6 is a conceptual diagram showing the contents of a physical resource management unit according to a third embodiment of the invention.
Figure 7:
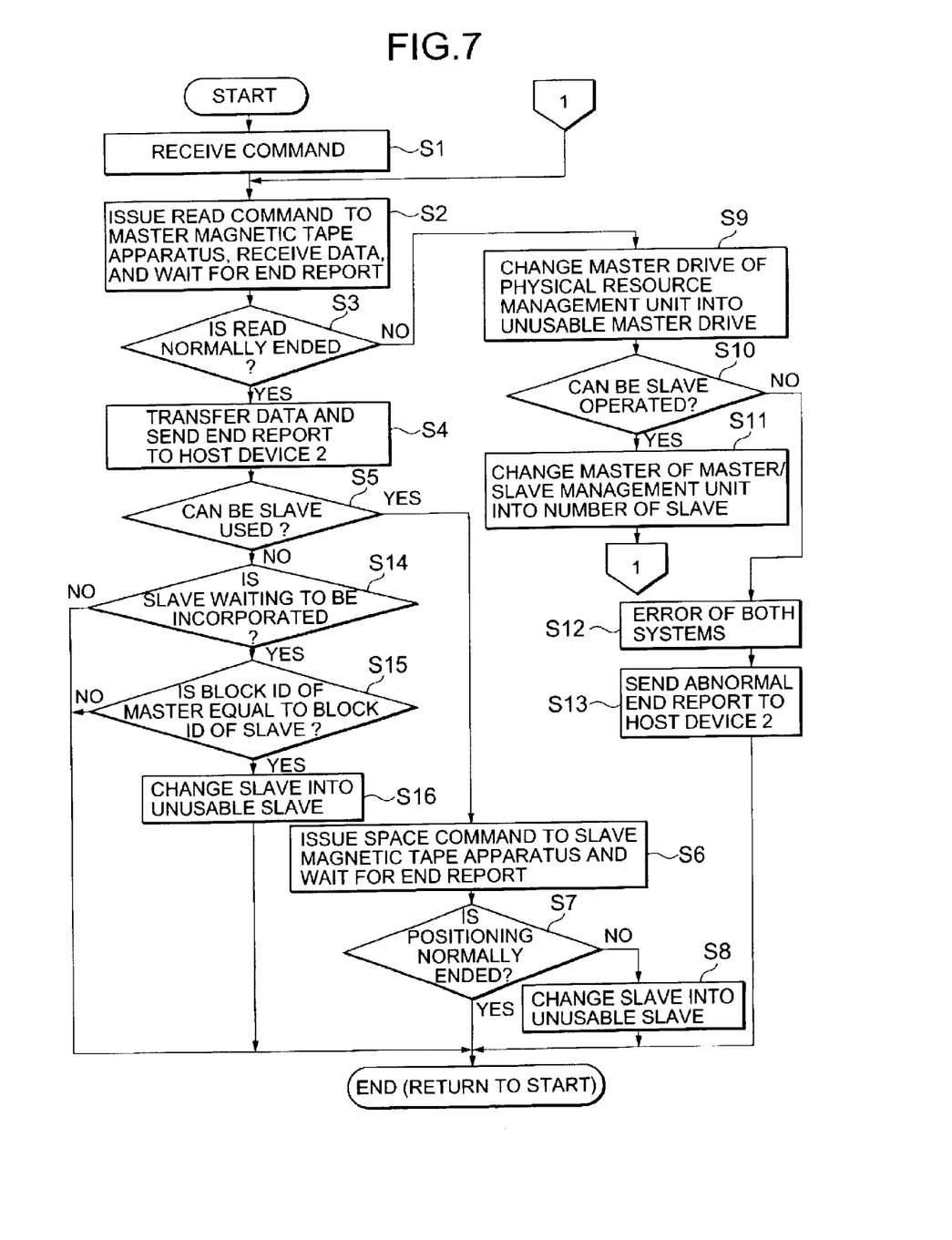
FIG. 7 is a flow chart showing an operation of a magnetic tape apparatus according to the third embodiment.
Figure 8:
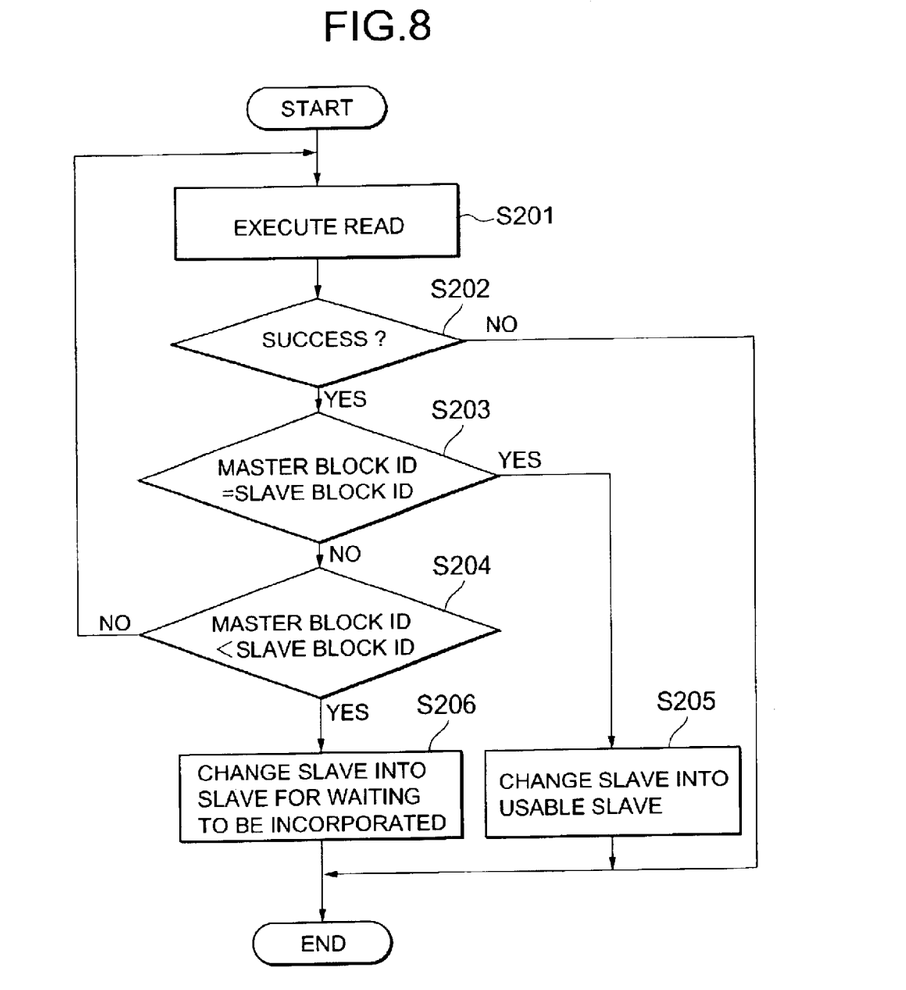
FIG. 8 is a flow chart showing a process performed for restoring a magnetic tape drive from a reduced state.

A third embodiment of the present invention will be described below with reference to FIGS. 6 to 8. FIG. 6 is a conceptual diagram showing the contents of a physical resource management unit. FIG. 7 is a flow chart showing an operation of an apparatus itself. FIG. 8 is a flow chart showing a process of recovering a magnetic tape drive from a reduced state.

In the first and second embodiment, when data cannot be read because a partial defect such as a scratch is formed in a recording area of a magnetic tape medium, the physical drive is made unusable, and the process is continued by only the other physical drive. In this embodiment, the drives are constituted by drives which include a format in which numbers are added to recorded data blocks from the start of a tape in ascending order to identify blocks, and the tape drive is not immediately reduced even though a partial defect such as a scratch is formed, so that the redundancy is recovered.

(Constitution)

Since the block diagram in this embodiment is the same as that of FIG. 1 or 4, a description thereof will be omitted. In this embodiment, the physical resource management unit 18, as shown in FIG. 6, includes buffer 25 for holding states 22 and 23 of the physical drives 31 and 32 and block identification numbers of data blocks just following positions where magnetic tapes loaded on the physical drives are located.

The states 22 and 23 of the physical drives 31 and 32, in the first and second embodiment, manage only two states, i.e., "usable" and "unusable". However, in this embodiment, in addition to "usable" and "unusable", "incorporation waiting", i.e., three states are managed. Furthermore, the block identification numbers stored in the BLOCK ID storage units 24 and 25 become valid only when the drive states 22 and 23 are in the "usable" or "incorporation waiting" state.

For this reason, data blocks in which data of the magnetic tape drive drives 31 and 32 are stored have the same block identification information in advance. More specifically, the block identification information is stored in the BLOCK ID storage units.

The control unit 13 according to this embodiment comprises an operation state updating function having the following configuration. That is, when it is recognized that a slave magnetic tape drive is in a standby state (e.g., a "usable" state or a "incorporation waiting" state) with reference to an operation state information storage area, data is read from the slave magnetic tape drive when the data can be read from the slave magnetic tape drive, the control unit 13 checks whether or not data in a data block from the slave magnetic tape drive is equal to data in a data block from which data is being read on the master magnetic tape drive. When the data are equal to each other, operation state information of the slave magnetic tape drive is rewritten into information representing that data can be read and written. The data to be compared may be block identification numbers of the data blocks from which data are being read. In the following explanation of an operation, it is decided whether the block identification numbers are equal to each other or not.

The operation state rewriting function held by the control unit 13 also operates as the following function. That is, when a data block from which data is read to the slave magnetic tape drive set in a standby state is unreadable, a readable data block subsequent to the unreadable data block is detected. When the block identification number of the readable data block is larger than the data block identification number which is being read on the master magnetic tape drive, the operation state information of the slave magnetic tape drive is written into information representing a incorporation waiting state. At this time, the control unit does not read data from a magnetic tape drive the operation state information of which is information representing the incorporation waiting state.

Note that the above functions are, as in the above other embodiments, realized such that programs for these functions are prepared in the program storage medium 19 in advance and installed in the control unit 13.
(Operation)

An operation in the third embodiment will be described below with reference to the block diagrams in FIGS. 1 and 6 and on the basis of the flow charts in FIGS. 7 and 8. For descriptive convenience, the description is made on the assumption that the magnetic tape drive 31 and the magnetic tape drive 32 operate as a Master and a Slave, respectively.

With reference to FIG. 8, a process performed when a magnetic tape drive is recovered from a reduced state will be described below. This process operates asynchronously with issue of a read command from the host device 2. The process is periodically executed when it is detected that the Slave drive 32 is in an "unusable" state.

When it is detected that the Slave drive 32 is in an "unusable" state, the control unit 13 issues a read command to the Slave drive (step S201). In general, a sequential medium such as a magnetic tape cannot be operated when the drive is disordered. However, when a read error occurs due to a defect of a recording medium, data can be read from a subsequent block. When the read command can be normally executed (step S202), the defective part of the recording medium is skipped, and it is determined that a part which can be normally read and which is subsequent to the defective part can be read. The contents of the BLOCK ID storage unit 25 of the Slave drive 32 are compared with the contents of the BLOCK ID storage unit 24 of the Master drive 31 (step S203). At this time, these contents are equal to each other, the state 23 of the Slave drive of the physical resource management unit 18 is changed from "unusable" into "usable" (step S205). The data to be compared are not limited to block identification numbers, and may be data themselves in the blocks.

When the contents are not equal to each other, the contents of the BLOCK ID storage unit 25 of the Slave drive 32 are compared with the contents of the BLOCK ID storage unit 24 of the Master drive 31 in size (step S204). When the contents (block identification number) of the BLOCK ID storage unit 25 of the Slave drive 32 is larger, it is determined that a read position of the Slave drive 32 is advanced ahead of the position of the Master drive 31 by skipping an error block, and the state 23 of the Slave drive of the physical resource management unit 18 is changed into a "incorporation waiting" state (step S206). The Slave drive waits until the position of the Master drive 31 catches the position of the BLOCK ID storage unit 25 of the Slave drive 32.

When the read command cannot be normally executed in step S202, it is interpreted that the drive cannot be operated because the drive is disordered or that the position is in an area including a defect of the recording medium, and the recovering process from the reduced state is stopped. Even though the read command is normally executed, when the contents of the BLOCK ID storage unit 24 of the Master drive 31 are larger than the contents (block identification number) of the BLOCK ID storage unit 25 of the Slave drive 32, it is succeeded that an area including a defect of the recording medium is skipped. However, it is determined that the Master drive 31 has been advanced, and the control flow returns to step S201 to repeat the advance until the read position catches the tape position of the Master drive 31. More specifically, the command is designed to be issued from the control unit 13.

An operation of the magnetic tape apparatus according to this embodiment will be described below with reference to FIG. 7. In this case, since operations in steps S1 to S13 in FIG. 7 are the same as those in the flow chart in FIG. 3 described in the first embodiment, the descriptions of the steps will be omitted.

Read of data from the control unit 13 is normally end (steps S1 to S4), the state of the Slave drive 32 is read to perform positioning for the Slave drive 32. When the state is a "usable" state, a positioning command is issued as in the first embodiment (step S5 and step S6).

When the state 23 of the physical drive 32 is in an "incorporation waiting" state (step S14), the contents of the BLOCK ID storage unit 24 of the Master drive 31 are compared with the contents of the BLOCK ID storage unit 25 of the Slave drive 32. If the contents are equal to each other (step S15), the state 23 of the Slave drive of the physical resource management unit is changed into a "usable" state (step S16).

At this time, even though the state 23 of the physical drive 32 is an "incorporation waiting" state, when the contents of the BLOCK ID storage unit 24 of the Master drive 31 are not equal to the contents of the BLOCK ID storage unit 25 of the Slave drive 32 (step S15), and when the Slave drive is in an "unusable" state (step S14), the Slave drive is not operated at all, and waits for the next command. However, independently of the process shown in FIG. 7, a process shown in FIG. 8 executed asynchronously with the process in FIG. 7 is performed, so that the Slave drive is set in an "incorporation waiting" state. The drive can be recovered from a reduced state.

This embodiment is described on the assumption that the process performed when the drive is recovered from the reduced state in FIG. 8 operates asynchronously with the read command from the host device. However, the process may be executed synchronously with a process performed when the state of the Slave drive of the read command is changed into the "unusable" state (step S8 in FIG. 7).

In this manner, in the first and second embodiments described above, once an error occurs, the drive in which the error occurs is reduced and losses redundancy. For this reason, when a failure occurs in another drive, the process cannot be easily continued, and an error report must be sent to the host device. However, in this embodiment, when the error which causes the reduction occurs due to a defect of the recording medium, the defective part is skipped to position a read position at a normally readable part which is written ahead of the defective part, and a state having redundancy can be recovered from the position. Therefore, even though the Master recording medium and the Slave recording medium include defects, data can be read unless errors occur in the same blocks. For this reason, the probability of interrupting the process of the host device can be reduced, and the availability can be more improved.

(effect)

Since the present invention is constituted and functions as described above, the present invention can the following novel excellent advantage. That is, according to the present invention, in a magnetic tape apparatus which can duplicate and store data, even though data cannot normally read due to a failure of one magnetic medium, a read position of another magnetic tape medium is set to be a position immediately before a block in which an error occurs. For this reason, the data can be restored from the other magnetic tape medium, and the restoration of data can be executed within a short period of time without performing a complex process. At this time, even though the occurrence of the failure is not recognized by the host device, the process can be continued by reducing the medium in which the failure occurs. Therefore, the process in the host device can be suppressed from being interrupted, and the availability can be improved.

When an amount of data is read out to a buffer at once, even though data cannot be normally read out due to a failure of one magnetic tape medium, the other physical drive has read the corresponding block and stored the block in the buffer in many cases. Therefore, waiting time for a switching operation can be shortened, and recovery read can be rapidly performed.

Furthermore, when the error which causes reduction occurs due to a defect of a recording medium, a defective part is skipped to position a read position at a normally readable part which is written ahead of the defective part, and a state having redundancy can be recovered from the position. Therefore, stability in a data read operation can be further improved.

While this invention has been described with reference to illustrative embodiments, this description is not intended to be construed in a limiting sense. Various modifications of the illustrative embodiments as well as other embodiments of the invention, will be apparent to persons skilled in the art upon reference to this description. It is, therefore, contemplated that the appended claims will cover any such modifications or embodiments as fall within the truescope of the invention.

What is claimed is:

1. A magnetic tape apparatus comprising:
   a plurality of magnetic tape drives, and a control unit for reading and writing information from/in the magnetic tape drives by a command from a host computer, wherein said control unit includes:
   means for storing the same data in the plurality of magnetic tape drives while duplicating the data;
   means for, when the reading duplicated data from one magnetic tape drive is completed, performing positioning such that a read position of another magnetic tape drive in which the same data is stored is advanced by a length corresponding to an amount of data read from one magnetic tape drive; and
   means for continuing read of data from the other magnetic tape drive when data is unsuccessfully read from one magnetic tape drive;
   a master magnetic tape drive, a slave magnetic tape drive;
   a control unit for reading and writing information from/in the magnetic tape drives by a command from a host computer, wherein said control unit includes:
   means for storing the same data in the magnetic tape drives while duplicating the data;
   means for, when the reading duplicated data from the master magnetic tape drive is completed by one block, performing positioning such that a read position of the slave magnetic tape drive is advanced by one block; and
   means for continuing read of data from the slave magnetic tape drive when data is unsuccessfully read from the master magnetic tape drive;
   an operation state information storage area of the magnetic tape drives, and the control unit, wherein said control unit includes:
   means for, when a process to the magnetic tape drive cannot be executed, storing information representing that the magnetic tape drive is unusable in the operation state information storage area;
   means for reducing the magnetic tape drive in which the unusable information is stored to set the magnetic tape drive in a standby state; and
   operation state rewriting means for, when the control unit recognizes that a slave magnetic tape drive is in a standby state with reference to the operation state information storage area, reading data from the slave magnetic tape drive, when the data of the slave magnetic tape drive can be read, checking whether or not data in a data block is equal to data in a data block which is being read at the present on the master magnetic tape drive, and rewriting the operation state information of the slave magnetic tape drive into information representing that the data can be read and written when the data are equal to each other.

2. A magnetic tape apparatus according to claim 1, comprising:
   data blocks in the magnetic tape drives, wherein
   the both data blocks include the same block identification information,
   the operation state rewriting means, when a data block of the slave magnetic tape drive in a standby state cannot be read, detects a readable data block subsequent to the data block, and, when a block identification number of the readable data block is larger than a data block identification number of the data block which is being read from the master magnetic tape drive, rewrites the operation state information of the slave magnetic tape drive into information representing an incorporation waiting state, and
   the control unit does not read data from a magnetic tape drive on which the operation state information is the incorporation waiting state.

3. A method for controlling an operation of a magnetic tape apparatus including a master magnetic tape drive, a slave magnetic tape drive, and a control unit for reading and writing information from/in the magnetic tape drives by a command from a host computer, the control unit including means for storing the same data in the magnetic tape drives + while duplicating the data, to read the duplicated data stored in the magnetic tape drives, comprising the steps of:

A. the control unit, when the reading duplicated data from the master magnetic tape drive is completed by one block, performs positioning such that a read position of the slave magnetic tape drive is advanced by one block;

B. the control unit continues read of data from the slave magnetic tape drive when data is unsuccessfully read from the master magnetic tape drive;

C. storing information related to operation states of the magnetic tape drives;

D. when a process to the magnetic tape drive cannot be executed, storing information representing that the magnetic tape drive is unusable in an operation state information storage area;

E. reducing the magnetic tape drive in which the unusable information is stored to set the magnetic tape drive in a standby state;

F. when it is recognized that the slave magnetic tape drive is in a standby state with reference to the operation state information storage area, reading data from the slave magnetic tape drive;

G. when the data of the slave magnetic tape drive can be read, checking whether or not data in a data block read when the data can be read is equal to data in a data block which is being read at the present on the master magnetic tape drive; and H. rewriting the operation state information of the slave magnetic tape drive into information representing that the data can be read and written when the data are equal to each other.

4. The method of claim 3, wherein said method further comprises:

I. when a data block in the data blocks which is in the tape drives and including the same block identification information, of the slave magnetic tape drive in the standby state cannot be read, detecting a readable data block subsequent to the data block; and J. when a block identification number of the readable data block is larger than a data block identification number of the data block which is being read from the master magnetic tape drive, rewriting the operation state information of the slave magnetic tape drive into information representing an incorporation waiting state; and K. data is not read from the magnetic tape drive on which the operation state information is the incorporation waiting state.

5. A computer-readable storage medium recording thereon a program which causes a computer to perform the steps of A. the control unit, when the reading duplicated data from the master magnetic tape drive is completed by one block, performs positioning such that a read position of the slave magnetic tape drive is advanced by one block; and B. the control unit continues read of data from the slave magnetic tape drive when data is unsuccessfully read from the master magnetic tape drive;

C. storing information related to operation states of the magnetic tape drives;

D. when a process to the magnetic tape drive cannot be executed, storing information representing that the magnetic tape drive is unusable in the operation state information storage area; and E. reducing the magnetic tape drive in which the unusable information is stored to set the magnetic tape drive in a standby state;

F. when it is recognized that the slave magnetic tape drive is in a standby state with reference to the operation state information storage area, reading data from the slave magnetic tape drive;

G. when the data of the slave magnetic tape drive can be read, checking whether or not data in a data block read when the data can be read is equal to data in a data block which is being read at the present on the master magnetic tape drive; and H. rewriting the operation state information of the slave magnetic tape drive into information representing that the data can be read and written when the data are equal to each other.

6. A computer-readable storage medium recording thereon a program which causes a computer to perform said steps of A. the control unit, when the reading duplicated data from the master magnetic tape drive is completed by one block, performs positioning such that a read position of the slave magnetic tape drive is advanced by one block;

B. the control unit continues read of data from the slave magnetic tape drive when data is unsuccessfully read from the master magnetic tape drive;

C. storing information related to operation states of the magnetic tape drives;

D. when a process to the magnetic tape drive cannot be executed, storing information representing that the magnetic tape drive is unusable in the operation state information storage area;

E. reducing the magnetic tape drive in which the unusable information is stored to set the magnetic tape drive in a standby state;

F. when it is recognized that the slave magnetic tape drive is in a standby state with reference to the operation state information storage area, reading data from the slave magnetic tape drive;

G. when the data of the slave magnetic tape drive can be read, checking whether or not data in a data block read when the data can be read is equal to data in a data block which is being read at the present on the master magnetic tape drive;

H. rewriting the operation state information of the slave magnetic tape drive into information representing that the data can be read and written when the data are equal to each other;

I. when a data block in the data blocks which is in the tape drives and including the same block identification information, of the slave magnetic tape drive in the standby state cannot be read, detecting a readable data block subsequent to the data block;

J. when a block identification number of the readable data block is larger than a data block identification number of the data block which is being read from the master magnetic tape drive, rewriting the operation state information of the slave magnetic tape drive into information representing an incorporation waiting state; and K. data is not read from the magnetic tape drive on which the operation state information is the incorporation waiting state.

* * * * *